(12) United States Patent
Ho et al.

(10) Patent No.: US 12,453,395 B2
(45) Date of Patent: Oct. 28, 2025

(54) FOOTWEAR MIDSOLE AND METHOD OF MANUFACTURING WITH EMBROIDERY MACHINE

(71) Applicant: NIKE, Inc., Beaverton, OR (US)

(72) Inventors: Fanny Yung Ho, Portland, OR (US); Guillermo Raffaele, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 38 days.

(21) Appl. No.: 18/174,725

(22) Filed: Feb. 27, 2023

(65) Prior Publication Data

US 2023/0210215 A1 Jul. 6, 2023

Related U.S. Application Data

(62) Division of application No. 16/991,715, filed on Aug. 12, 2020, now Pat. No. 11,617,423.

(Continued)

(51) Int. Cl.
| | |
|---|---|
| *A43D 8/18* | (2006.01) |
| *A43B 13/12* | (2006.01) |
| *A43B 13/14* | (2006.01) |
| *A43B 13/32* | (2006.01) |
| *A43B 23/02* | (2006.01) |
| *A43D 8/02* | (2006.01) |

(Continued)

(52) U.S. Cl.
CPC .............. *A43D 8/18* (2013.01); *A43B 13/125* (2013.01); *A43B 13/14* (2013.01); *A43B 13/32* (2013.01); *A43B 23/0255* (2013.01); *A43D 8/02* (2013.01); *D05B 37/04* (2013.01); *D05B 81/00* (2013.01); *D05C 7/04* (2013.01)

(58) Field of Classification Search
CPC ..... A43B 13/125; A43B 13/14; A43B 13/141; A43B 23/0255
See application file for complete search history.

(56) References Cited

U.S. PATENT DOCUMENTS

2005/0268487 A1* 12/2005 Ellis, III .............. A43B 13/187
36/25 R
2006/0156579 A1 7/2006 Hoffer et al.
(Continued)

FOREIGN PATENT DOCUMENTS

| CN | 101953535 A | 1/2011 |
|---|---|---|
| JP | 3010288 U | 4/1995 |

(Continued)

OTHER PUBLICATIONS

Pattern, Dictionary.com (https://www.dictionary.com/browse/pattern) (last vitied Nov. 6, 2024). (Year: 2024).*

*Primary Examiner* — Patrick J. Lynch
(74) *Attorney, Agent, or Firm* — Quinn IP Law

(57) ABSTRACT

A method of manufacturing a midsole for an article of footwear includes cutting a pattern of openings at least partway through a midsole with a cutting tool driven by an embroidery machine. An article of footwear includes a midsole defining a pattern of openings extending at least partway through the midsole. An inner surface of the midsole is contoured and the midsole includes upwardly-extending sidewalls. At least some of the openings extend relatively nonparallel with one another through the sidewalls and splay away from one another along longitudinal axes of the openings.

8 Claims, 13 Drawing Sheets

Related U.S. Application Data

(60) Provisional application No. 62/910,517, filed on Oct. 4, 2019.

(51) Int. Cl.
   *D05B 37/04*  (2006.01)
   *D05B 81/00*  (2006.01)
   *D05C 7/04*  (2006.01)

(56) References Cited

U.S. PATENT DOCUMENTS

| | | | |
|---|---|---|---|
| 2007/0220778 A1* | 9/2007 | Fusco | A43B 13/186 36/28 |
| 2009/0126230 A1* | 5/2009 | McDonald | A43B 13/12 36/103 |
| 2014/0115925 A1* | 5/2014 | Hurd | A43B 13/125 156/182 |
| 2014/0196308 A1* | 7/2014 | Baratta | A43B 13/206 12/146 B |
| 2015/0075033 A1* | 3/2015 | Cross | A43B 13/223 36/103 |
| 2015/0245685 A1 | 9/2015 | Cross et al. | |
| 2015/0245686 A1 | 9/2015 | Cross | |
| 2016/0262494 A1* | 9/2016 | Weidl | A43B 23/042 |
| 2016/0353836 A1* | 12/2016 | Luedecke | A43B 13/16 |
| 2017/0238652 A1* | 8/2017 | Langvin | A43B 13/141 |
| 2017/0245586 A1* | 8/2017 | Cook | A43D 1/02 |
| 2017/0245588 A1* | 8/2017 | Cook | A43B 13/04 |
| 2017/0258178 A1* | 9/2017 | Cross | A43B 13/14 |
| 2017/0258180 A1* | 9/2017 | Cross | A43B 1/0009 |
| 2018/0271213 A1* | 9/2018 | Perrault | A43B 13/141 |
| 2018/0303197 A1* | 10/2018 | Chen | A43B 13/12 |
| 2018/0338573 A1* | 11/2018 | Cross | A43B 13/141 |
| 2018/0360163 A1* | 12/2018 | Langvin | A43B 13/14 |
| 2020/0275739 A1* | 9/2020 | Linkfield | A43B 13/127 |
| 2020/0315296 A1* | 10/2020 | Giorgini | D04B 1/22 |
| 2020/0345102 A1 | 11/2020 | Choi et al. | |
| 2020/0390188 A1* | 12/2020 | Cass | A43B 13/184 |

FOREIGN PATENT DOCUMENTS

| | | |
|---|---|---|
| KR | 19990005377 U | 2/1999 |
| KR | 200248603 Y1 | 10/2001 |
| WO | 2016144408 A1 | 9/2016 |

* cited by examiner

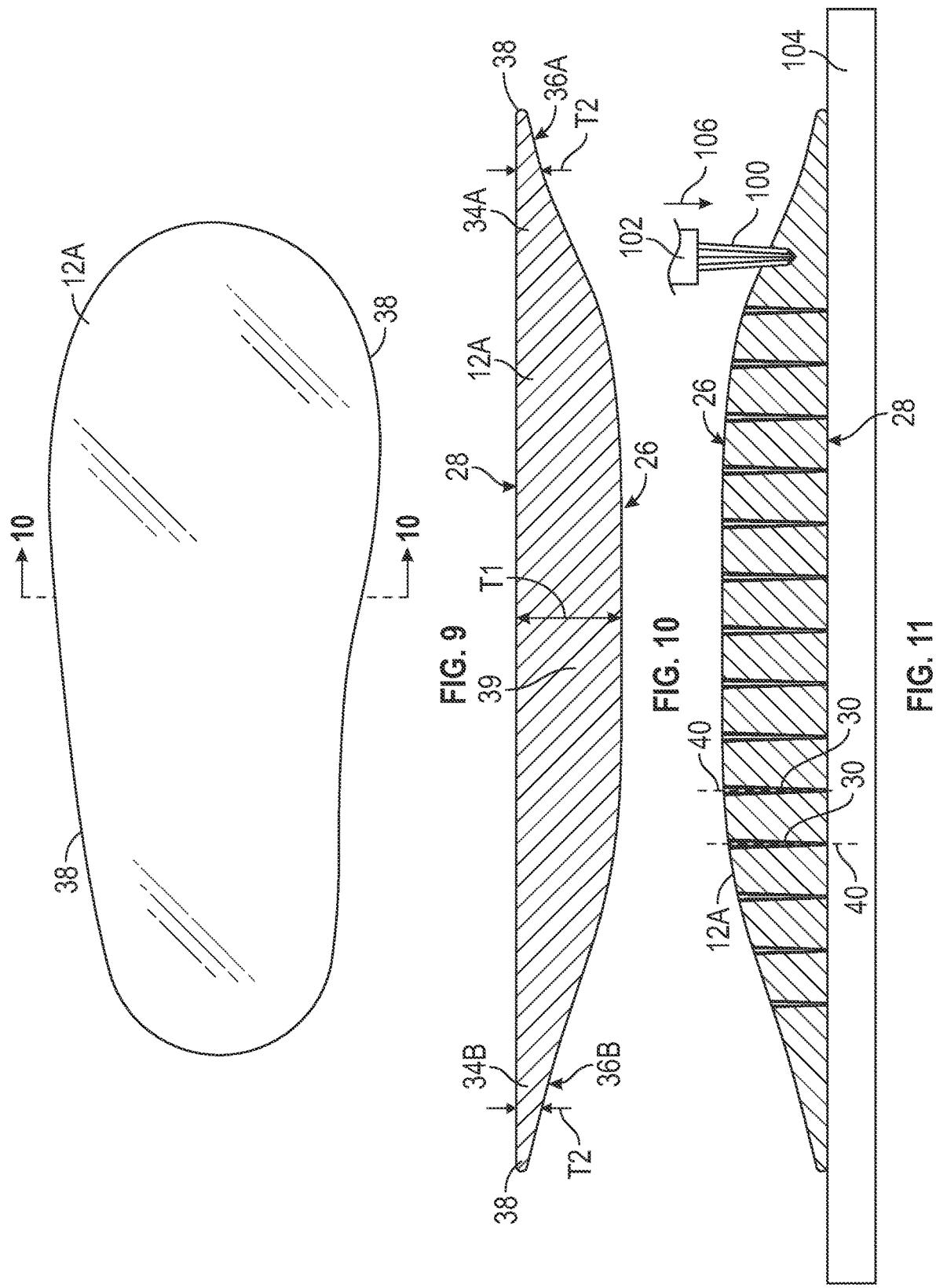

FOOTWEAR MIDSOLE AND METHOD OF MANUFACTURING WITH EMBROIDERY MACHINE

CROSS-REFERENCE TO RELATED APPLICATIONS

This application is a division of U.S. Nonprovisional application Ser. No. 16/991,715, filed Aug. 12, 2020, which claims the benefit of priority to U.S. Provisional Application No. 62/910,517 filed Oct. 4, 2019, and each of which are hereby incorporated by reference in their entirety.

TECHNICAL FIELD

The present disclosure generally relates to an article of footwear and a method of manufacturing an article of footwear, and more specifically to a midsole manufactured using an embroidery machine.

BACKGROUND

Footwear often includes many components of many different materials. An article of footwear typically includes a sole structure configured to be located under a wearer's foot to space the foot away from the ground. Sole structures in athletic footwear are typically configured to provide cushioning, motion control, and/or resilience. Footwear manufacturers strives to provide high quality, durable footwear in an efficient manner.

BRIEF DESCRIPTION OF THE DRAWINGS

The drawings described herein are for illustrative purposes only, are schematic in nature, and are intended to be exemplary rather than to limit the scope of the disclosure.

FIG. 9 is a top view of a preform of the midsole of FIG. 1.

FIG. 10 is a cross-sectional view of the preform of FIG. 9 taken at lines 10-10 in FIG. 9.

FIG. 11 is a schematic depiction of an embroidery machine cutting tool cutting the pattern of openings in the preform of FIG. 9 with the preform inverted and placed on a work fixture.

DESCRIPTION

Figure 1:
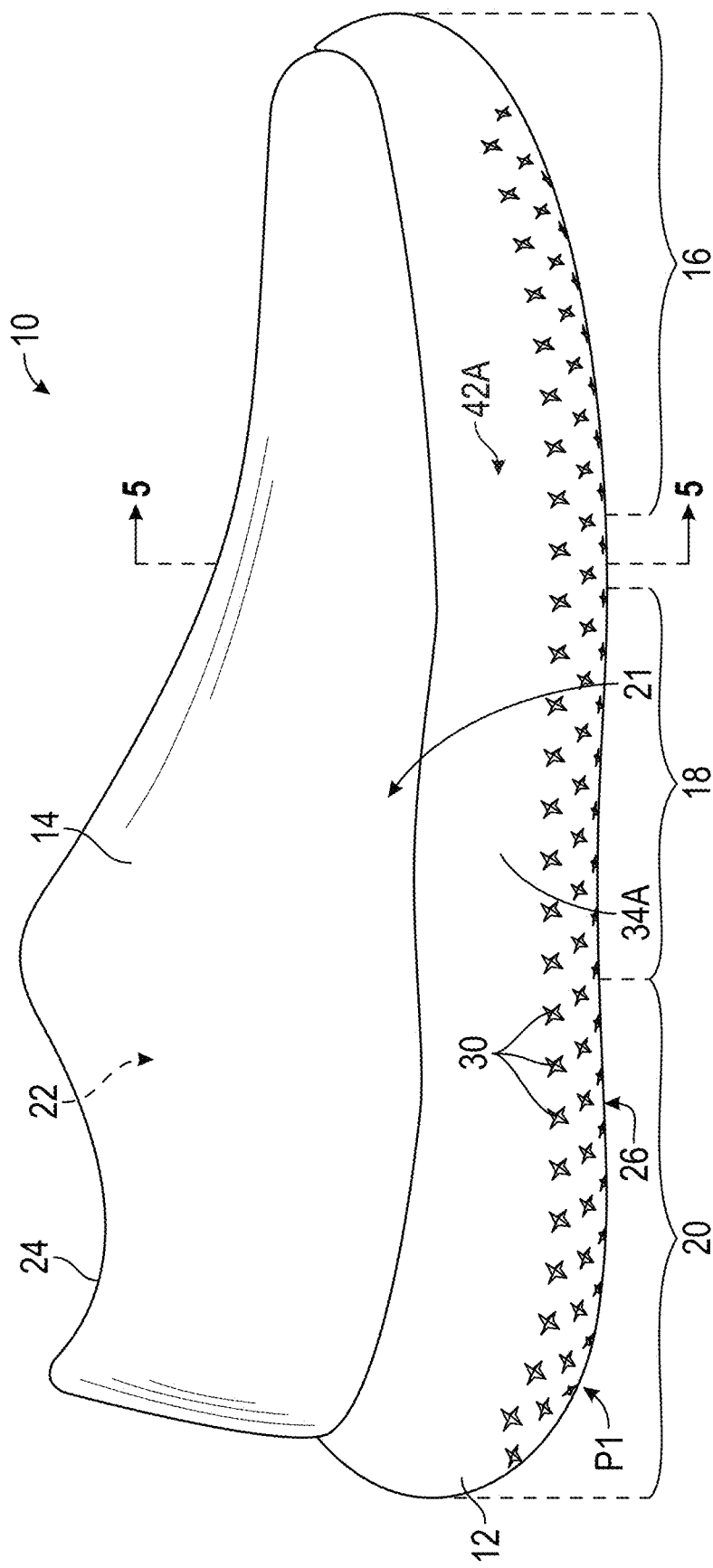
FIG. 1 is a medial side view of an article of footwear having a midsole with a first pattern of openings cut by a tool driven by an embroidery machine.

The present disclosure generally relates to a method of manufacturing a midsole for an article of footwear and to an article of footwear that includes the midsole. Under the method, an embroidery machine controls a cutting tool to create a pattern of openings in the midsole with the cutting tool. Utilizing the embroidery machine and cutting tool in this nontraditional way (e.g., for cutting holes in a midsole rather than for embroidering a textile with thread) enables accurate manufacturing and ease in changing the pattern of openings by simply reprogramming the machine rather than investing in additional molds or cutting blades.

The method may include cutting a pattern of openings at least partway through a midsole with a cutting tool driven by an embroidery machine. For example, a cutting tool may be disposed in a needle drive of the embroidery machine. For example, the cutting tool may be an embroidery punch needle. A single cutting tool may be used, or multiple cutting tools may be driven by multiple needle drives of the embroidery machine to make the pattern of openings. Cutting the pattern of openings may also be referred to as punching the pattern of openings. The pattern of openings is configured to provide flexibility to the midsole during use. Additionally, if the midsole is formed around and secured to a lasted upper as disclosed herein, the pattern of openings may more easily allow flexing (e.g., bending) of the midsole to conform to the lasted upper during thermoforming.

In some embodiments, the cutting tool may be cone-shaped along a length of the cutting tool. In the same or different embodiments, the cutting tool may have a star shape at a cross-section taken perpendicular to a length of the cutting tool. For example, the star shape may be a four-pointed star.

In an aspect, the openings may extend only partway through the midsole. In another implementation, the openings may extend completely through the midsole from an inner surface of the midsole to an outer surface of the midsole. Controlling the embroidery machine such as according to a stored program enables a user to control the distance that the cutting tool extends into the midsole during cutting thereby configuring the resulting openings.

Cutting the openings in the midsole may occur when the midsole is a midsole preform, and the method may include, after cutting the openings in the midsole, thermoforming the midsole preform to a final formed shape. The midsole preform may have a flat inner surface (e.g., a flat upper surface) and a contoured outer surface (e.g., a contoured lower surface). Longitudinal axes of the openings may extend relatively parallel with one another at least partially through the midsole preform. For example, the flat inner surface may be placed on a work fixture (e.g., face down on the flat inner surface) and the one or more cutting tools driven by the embroidery machine from the contoured outer surface toward the flat inner surface in a common direction through the midsole preform as the midsole preform is moved transversely relative to the cutting tool (or vice versa) between successive drives of the cutting tool to enable the pattern of openings. In contrast, the inner surface of the midsole may be contoured in the midsole final formed shape due to the thermoforming, and at least some of the longitudinal axes of the openings may then extend relatively nonparallel with one another and splay away from one another in the midsole final formed shape. Configuring the midsole preform with a flat inner surface increases the ease of manufacturing as the midsole preform is less likely to shift or wobble relative to the needle drive and cutting tool when resting on its flat inner surface during the cutting operation.

In an aspect, prior to the thermoforming step, the method may also include disposing adhesive on the flat inner surface of the preform and then adhering the inner surface of the midsole to a bottom of a footwear upper and to sidewalls of the footwear upper during thermoforming. The method may include lasting the upper (e.g., placing the upper on a footwear last) prior to adhering the inner surface of the midsole to the footwear upper.

In an aspect, the midsole may be a foamed thermoplastic. A midsole of this material may cause a volume of the midsole to decrease due to the thermoforming so that the openings are wider after said thermoforming than before said thermoforming (e.g., a volume of the midsole preform is greater than the volume of the midsole in its final formed shape). Additionally, foamed thermoplastic midsoles maintain their final formed shape after thermoforming, and may be configured to be relatively soft so that the cutting tool can drive through the midsole when cutting the openings without excessive resistance.

By using an embroidery machine to drive the cutting tool and create the openings in the midsole, molds with pins need not be created for each desired midsole pattern of openings. Instead, the embroidery machine can simply be programmed with a cutting tool drive pattern that creates a desired pattern of openings. For example, the method may provide a first pattern of openings in a first midsole, and the method of manufacturing may further comprise programming the embroidery machine to drive the cutting tool according to a second pattern different than the first pattern, and then cutting the openings at least partway through a second midsole in the second pattern with the cutting tool driven by the embroidery machine.

An article of footwear, such as an article of footwear having a midsole manufactured according to the method described, may comprise a midsole defining a pattern of openings extending at least partway through the midsole. In the final formed shape of the midsole described according to the method, an inner surface of the midsole may be contoured and the midsole may include upwardly-extending sidewalls extending to a peripheral edge of the midsole. At least some of the openings may extend relatively nonparallel with one another through the sidewalls and splay away from one another along longitudinal axes of the openings.

In some embodiments of the article of footwear, each of the openings of the pattern of openings may be cone-shaped along a length of the opening. Additionally or alternatively, each of the openings may be a star shape at a cross-section taken perpendicular to a length of the opening. In some implementations, the openings may extend only partway through the midsole. In other implementations, the openings may extend completely through the midsole from the inner surface of the midsole to an outer surface of the midsole.

The midsole may have a shape such that a thickness of the midsole between the inner surface and an outer surface of the midsole is smaller at the peripheral edge than within a central region of the midsole. For example, the midsole may taper in thickness from the central region to the peripheral edge of the midsole (e.g., at the sidewalls of the midsole). In some implementations, the article of footwear may include an upper, and the inner surface of the midsole may be adhered to the footwear upper and may follow a contour of the footwear upper. The sidewalls of the midsole may extend up sidewalls of the upper.

The above features and advantages and other features and advantages of the present teachings are readily apparent from the following detailed description of the modes for carrying out the present teachings when taken in connection with the accompanying drawings.

FIG. 1 shows an article of footwear 10 that includes a midsole 12 secured to an upper 14. The midsole 12 is in its final formed shape, and includes a first pattern P1 of openings 30 extending at least partially through the midsole 12 and imparted by a cutting tool 100 of an embroidery machine 102 (both shown in FIG. 12) as discussed herein. The article of footwear 10 includes a forefoot region 16, a midfoot region 18, and a heel region 20. The forefoot region 16 generally includes portions of the article of footwear 10 corresponding with the toes and the metatarsophalangeal joints (which may be referred to as MPT or MPJ joints) connecting the metatarsal bones of the foot and the proximal phalanges of the toes. The midfoot region 18 generally includes portions of the article of footwear 10 corresponding with the arch area and instep of the foot, and the heel region 20 corresponds with rear portions of the foot, including the calcaneus bone. The forefoot region 16, the midfoot region 18, and the heel region 20 are not intended to demarcate precise areas of the article of footwear 10, but are instead intended to represent general areas of the article of footwear 10 to aid in the following discussion.

Figure 5:
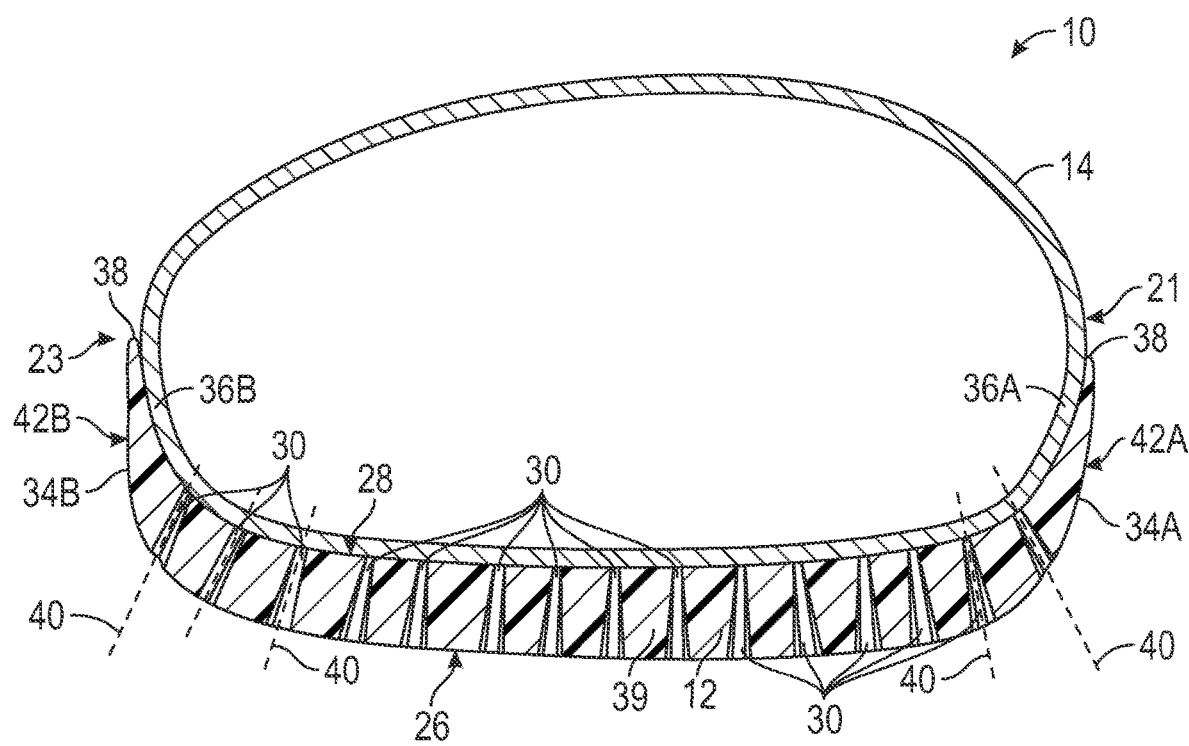
FIG. 5 is a cross-sectional view of the footwear of FIG. 1 taken at lines 5-5 in FIG. 1.

The footwear 10 has a medial side 21 (shown in FIG. 1) and a lateral side 23 (best shown in FIG. 5). The medial side 21 and the lateral side 23 extend through each of the forefoot region 16, the midfoot region 18, and the heel region 20, each falling on an opposite side of a longitudinal midline of the article of footwear 10, as is understood by those skilled in the art. The medial side 21 is thus considered opposite to the lateral side 23.

The midsole 12 may be an elastomeric foam such as a polyurethane or ethylvinylacetate foam to attenuate ground reaction forces (e.g., provide cushioning) when compressed between the foot and the ground during walking, running, or other ambulatory activities. In the embodiment shown, the midsole 12 may be at least partially a foamed thermoplastic, a polyurethane foam, and/or a polyurethane ethylene-vinyl acetate (EVA) foam, and may include heat-expanded and molded EVA foam pellets. The midsole 12 may generally include phylon (ethylene vinyl acetate or "EVA") and/or polyurethane ("PU") base resins. Other suitable materials will become readily apparent to those skilled in the art, given the benefit of this disclosure.

The upper 14 may be a variety of materials, such as leather, textiles, polymers, cotton, foam, composites, etc. For example, the upper 14 may be a polymeric material capable of providing elasticity, and may be of a braided construction, a knitted (e.g., warp-knitted) construction, or a woven construction. The upper 14 at least partially defines a foot-receiving cavity 22 that receives a foot inserted through an opening 24 in the upper 14, such as an ankle opening. In some embodiments, the upper 14 may be secured at a lower extent to a strobel. In the embodiments shown, the upper 14 is instead a sock-like or bootie construction that includes a bottom portion. An insole (not shown) may rest in the foot-receiving cavity 22, or there may be no insole. The upper 14 may be tightenable around the foot by the use of the tensioning components, and/or by laces, straps, or other tightening mechanisms.

Figure 2:
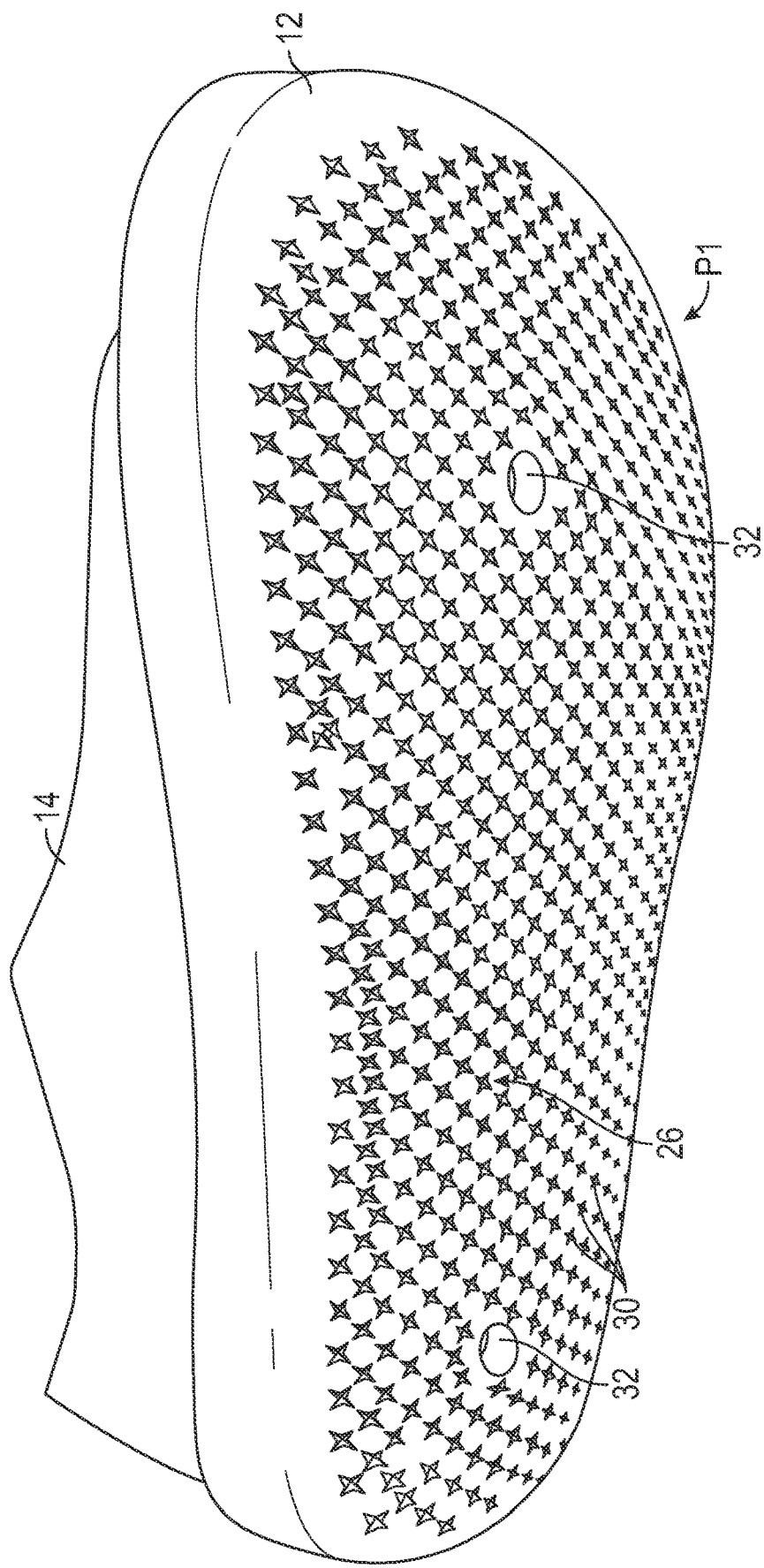
FIG. 2 is a bottom perspective view of the midsole of FIG. 1.
Figure 3:
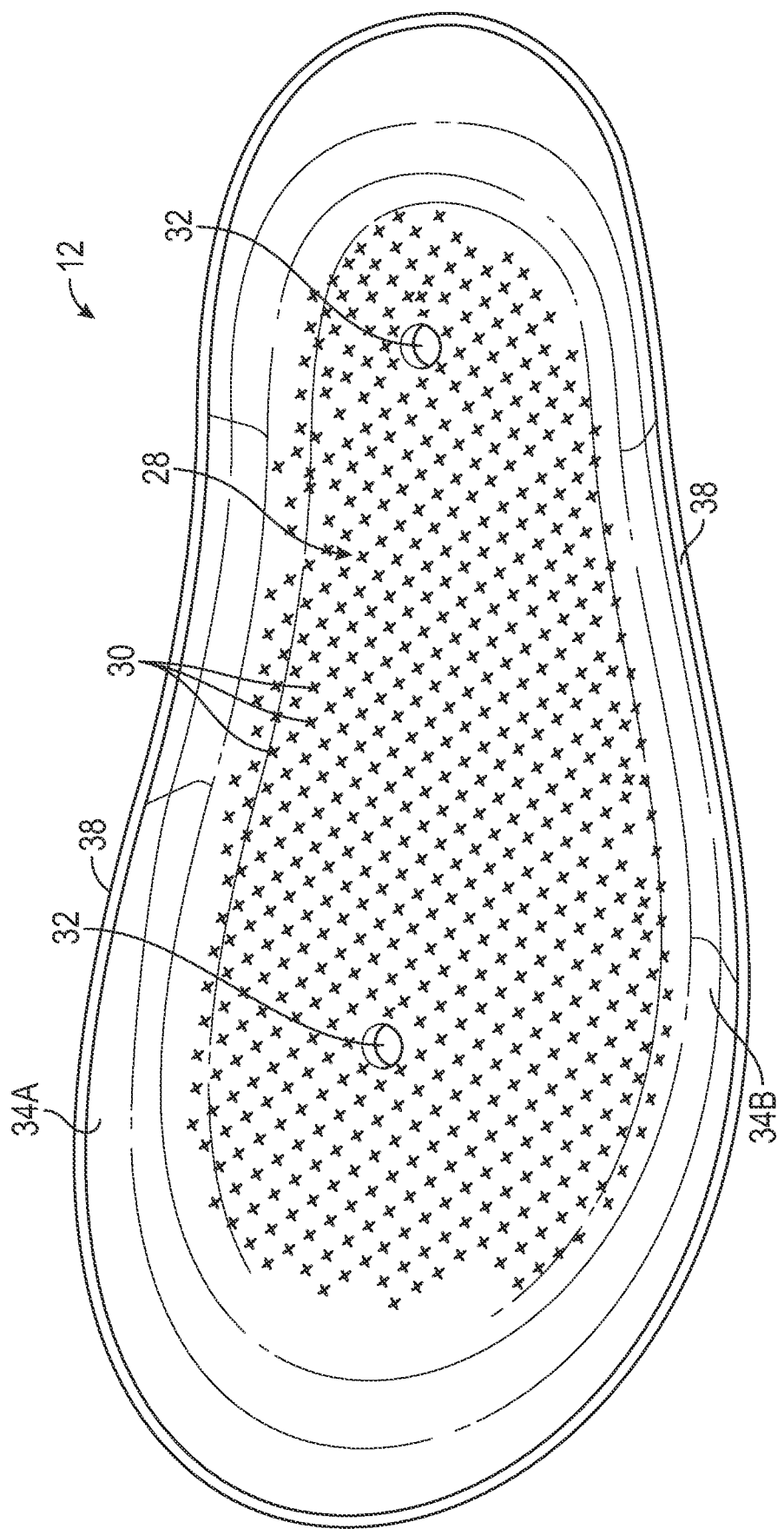
FIG. 3 is a top view of the midsole of FIG. 1.

As shown in FIGS. 1-3, the midsole 12 is shown as a unitary (e.g., one-piece) midsole 12 in a final-formed shape after thermoforming the midsole 12 to secure it to the upper 14. The midsole 12 may serve as a both the midsole and as an outsole, or an additional outsole or outsole components may be secured to a bottom surface 26 of the midsole 12. As shown, the bottom surface 26 is also a ground-engaging surface and the midsole is a unisole. Guide openings 32 for properly placing the midsole 12 on the lasted upper 14 as described herein are shown in FIGS. 2-3. In some embodiments especially where no additional outsole is secured to the midsole 12, such openings 32 may be absent or may be of a smaller size than shown.

Figure 6:
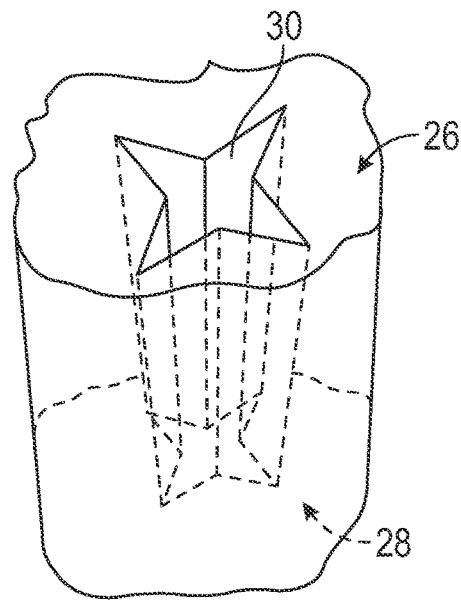
FIG. 6 is a fragmentary perspective view of one of the openings of FIG. 1 with the midsole inverted.

The midsole 12 is manufactured according to the method 200 described herein so that it defines a first pattern P1 of openings 30, with each of the openings 30 extending at least partway through the midsole 12. In the embodiment of FIGS. 1-6, the openings 30 extend completely through the midsole 12. For example, the openings 30 may extend through the midsole 12 from the bottom surface 26 to the inner surface 28. The inner surface 28 may also referred to as a top surface as shown in FIGS. 5 and 6. When the midsole 12 is thermoformed to the upper 14, at least some of the openings 30 extend through sidewalls 34A, 34B of the midsole 12, such as a medial sidewall 34A and a lateral sidewall 34B as shown in FIG. 5.

Figure 4:
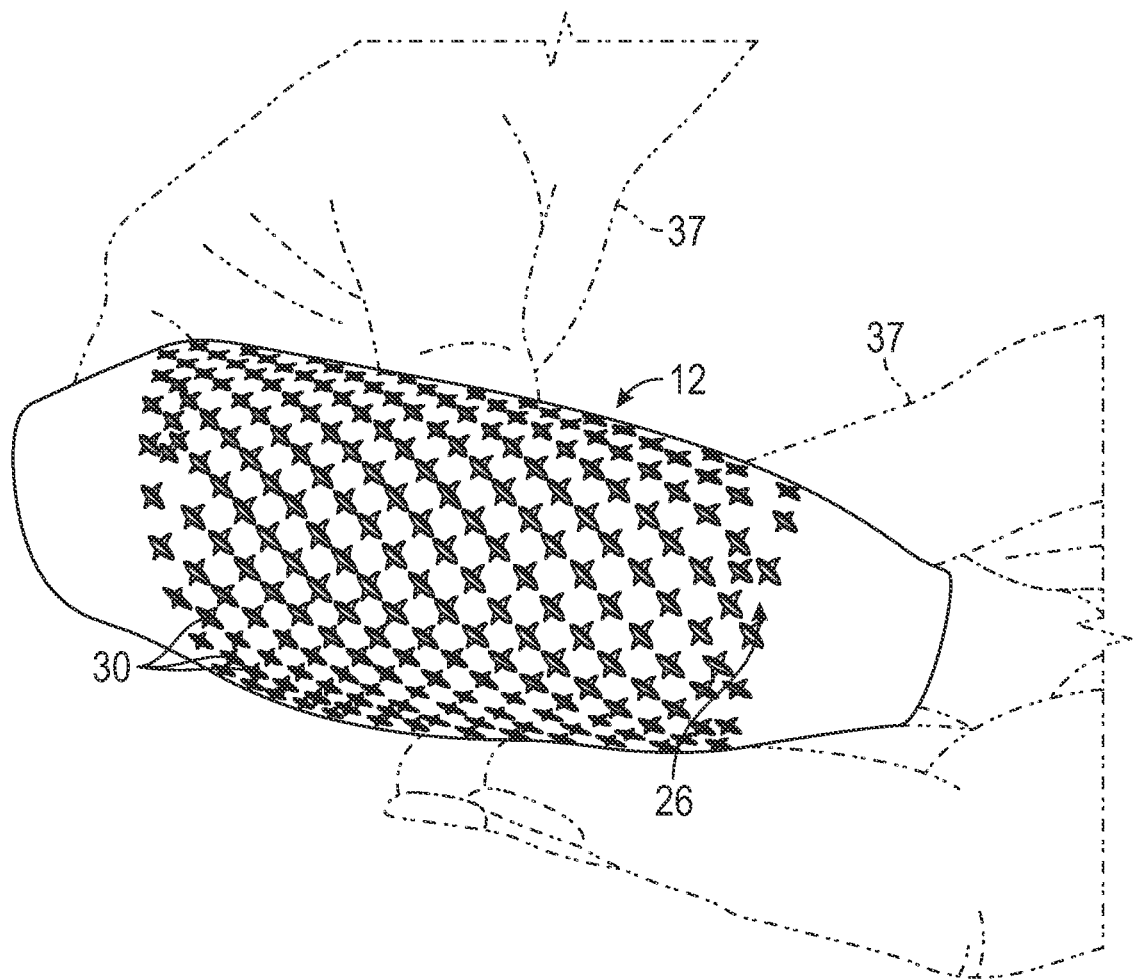
FIG. 4 is a perspective view of the midsole of FIG. 1 being flexed in a longitudinal direction by hands shown in phantom.
Figure 14:
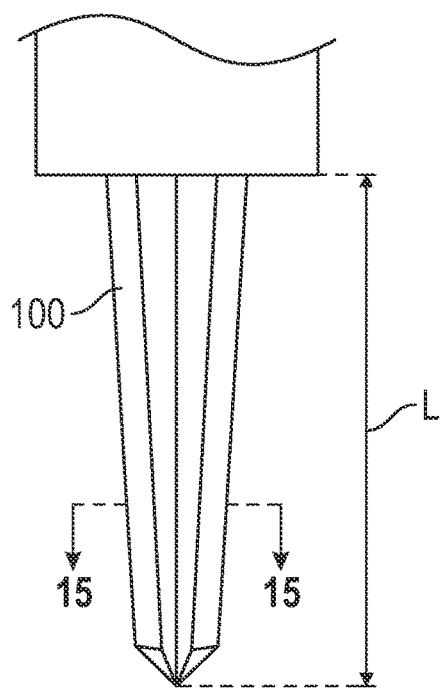
FIG. 14 is a side view of the cutting tool of FIG. 13.

The midsole 12 of FIG. 1 is shown in its final formed shape, with the inner surface 28 of the midsole 12 adhered to the footwear upper 14 to follow a contour of the footwear upper 14 as best shown in FIG. 5. For example, the midsole 12 is adhered to a bottom of the footwear upper 14 and the medial and lateral sidewalls 34A, 34B of the midsole 12 extend up and are adhered to respective medial and lateral sidewalls 36A, 36B of the upper 14. A comparison of FIGS. 2 and 3 show that the openings 30 are smaller at the inner surface 28 than at the bottom surface 26. FIG. 6 illustrates this with respect to one of the openings 30. The tapering of the opening 30 from the bottom surface 26 to the inner surface 28 is due to the tapered cone shape of the tool 100 along its length L as shown in FIG. 14. Additionally, the openings 30 are generally a four-pointed star shape in cross-section (e.g., at a plane taken perpendicular to the longitudinal axis of the opening 30). FIG. 4 illustrates that the longitudinal cone shape and the transverse four-pointed star shape of the opening 30 enhances the flexibility of the midsole 12, which is shown being flexed by hands 37 doubling the midsole 12 over along its length. The shape of the tool 100 along its length L and in cross-section is just one example of a tool shape and cutting tools with other shapes may be used within the scope of the disclosure.

In the final formed shape of the midsole 12 shown in FIG. 5, the inner surface 28 of the midsole 12 is contoured and concave and the midsole 12 includes upwardly-extending sidewalls 34A, 34B extending to a peripheral edge 38 of the midsole 12. When the midsole 12 is thermoformed to the upper 14 in this manner, at least some of the openings 30 may extend relatively nonparallel with one another through the sidewalls 34A, 34B and splay away from one another along longitudinal axes 40 of the openings 30 as shown in FIG. 5. When initially cut in the midsole, however, the longitudinal axes 40 of the openings 30 may extend generally parallel with one another as cutting the openings 30 may occur when the midsole is a preform indicated with reference number 12A, as shown in FIGS. 9-11. The midsole in its preform shape may be referred to as a midsole preform. The inner surface 28 of the midsole preform 12A is relatively flat, and the outer surface of the midsole preform 12A (including the bottom surface 26 and outer surfaces 42A, 42B of the respective sidewalls 34A, 34B) is relatively contoured. As used herein, an inner surface is considered to be "flat" when it can be placed face down and cut by the cutting tool 100 without tilting, rocking, or otherwise shift in position during cutting. Accordingly, within the scope of the disclosure, an inner surface need not be entirely or perfectly flat to be considered flat.

The midsole preform 12A may be placed on a work fixture 104 of the embroidery machine 102 on its flat inner surface 28 (e.g., bottom side up) for stability when the cutting tool 100 is driven at least partially through the midsole 12A from the contoured outer surface 26, 42A, 42B toward the flat inner surface 28 by the embroidery machine 102 as shown in FIG. 11 so that the longitudinal axes 40 of the openings 30 extend relatively parallel with one another at least partially through the midsole preform 12A. For example, the one or more cutting tools 100 driven by the embroidery machine 102 may be driven in a common direction through the midsole preform 12A as the midsole preform 12A is moved transversely relative to the cutting tool 100 (or vice versa) between successive drives of the cutting tool 100 to enable the pattern of openings. Such a design may increase manufacturing efficiency by eliminating any need to reorient the cutting tool for each opening 30 and/or eliminate the need to reorient the midsole preform 12A relative to the cutting tool 100 other than to move the work fixture 104 and the midsole preform 12A thereon transversely relative to the tool 100. In an embodiment where the inner surface 28 is substantially flat/planar when the midsole 12A is in the preform state, this common cutting direction may be orthogonal to the flat inner surface 28, such as in the direction of arrow 106 shown in FIG. 11.

In FIGS. 5 and 6, the openings 30 are depicted as having a four-pointed star shape (best shown in FIG. 6), and each opening 30 is cone-shaped along its longitudinal axis 40. More particularly, the openings 30 are wider at the outer surface (bottom surface 26 and sidewall surfaces 42A, 42B) than at the inner surface 28. This particular shape of the opening 30 is only one of many possible shapes and results from the shape of the particular cutting tool 100 shown and described herein. By configuring the openings 30 as cone-shaped and wider at the bottom, as well as star shaped, the foam material of the midsole 12 may more easily compress both downward and outward at each of the openings 30 during dynamic loading of the midsole 12 than if openings with straight, cylindrical shapes were cut in the midsole preform 12A. FIGS. 1, 2, and 5 show that the openings 30 extend only partway up the sidewalls 34A, 34B such that at least an upper half of side surfaces 42A, 42B of the midsole 12 at each of the sidewalls 34A, 34B is characterized by an absence of the openings 30.

Figure 7:
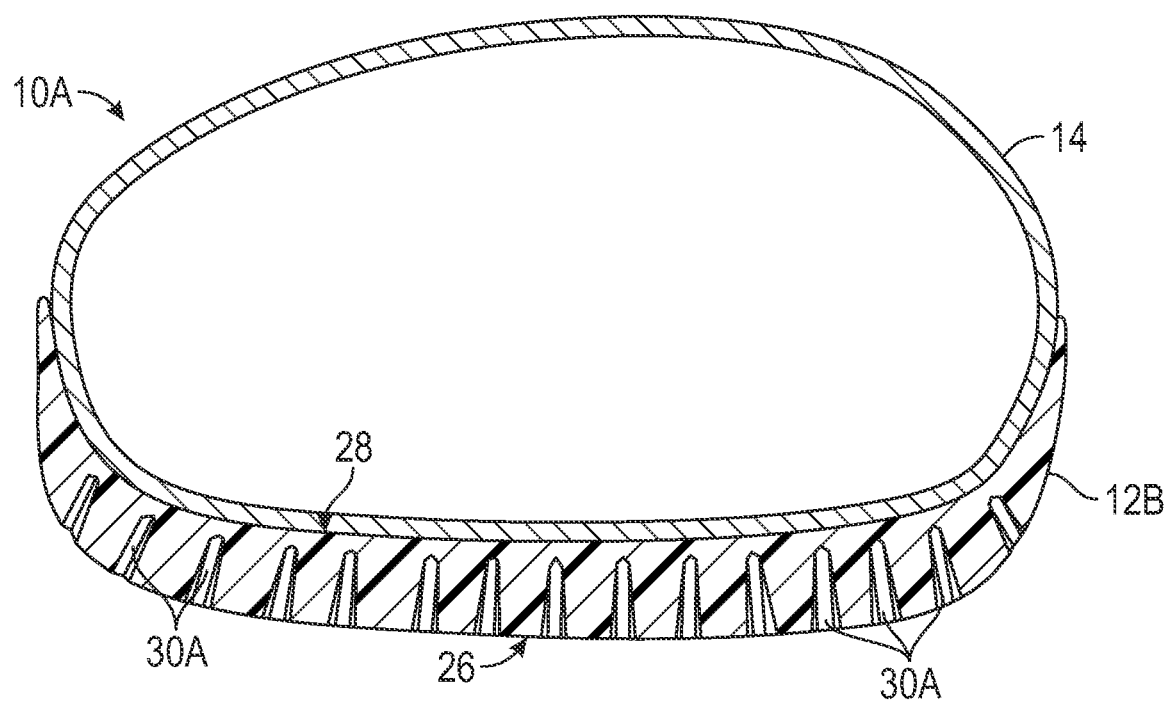
FIG. 7 is a cross-sectional view of an article of footwear having a pattern of different openings cut by the tool driven by the embroidery machine with the openings extending only partway through the midsole.
Figure 8:
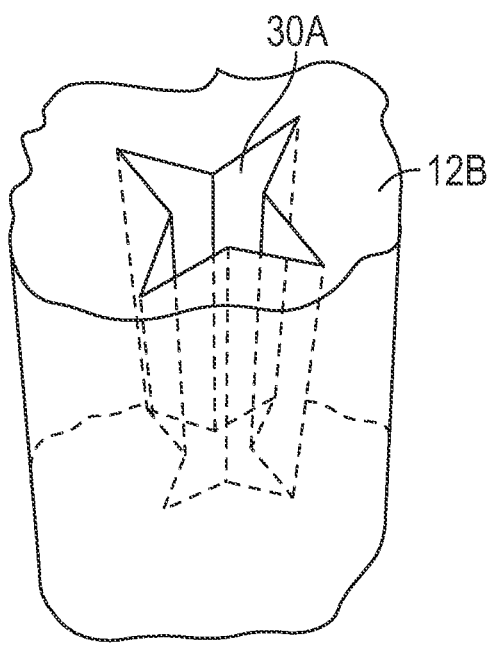
FIG. 8 is a fragmentary perspective view of one of the openings of FIG. 7 with the midsole inverted.

In some embodiments, the stiffness and/or cushioning properties of the midsole 12 may be altered to meet different design objectives by varying the depth of the cut openings 30 (e.g., cut openings that extend only partway through the midsole 12 may provide a stiffer midsole 12 whereas cut openings 30 that extend entirely through the midsole 12 provide a softer (e.g., less stiff) midsole 12 with increased cushioning). FIGS. 7-8, for example, show an alternative article of footwear 10A with a midsole 12B manufactured according to the method 200 described herein but with the cutting tool 100 controlled by the embroidery machine 102 so that the resulting cut openings 30A (some of which are labelled in FIG. 7) extend only partway through the midsole 12B. The cut openings 30A are depicted as extending from the outer surface (e.g., the bottom surface 26 and the surfaces 36A, 36B of the sidewalls 34A, 34B) only partway to the inner surface 28. The article of footwear 10A is otherwise identical to the article of footwear 10, and the midsole 12B is otherwise identical to the midsole 12 as described. When cutting the openings 30A, the controller 108 is programmed to control the cutting tool 100 to extend a distance through the midsole 12B less than the particular thickness of the midsole 12B at each respective opening 30A.

As best shown in FIGS. 9 and 10, the midsole preform is indicated with reference numeral 12A and has a shape such that a thickness of the midsole preform 12A between the flat inner surface 28 and the contoured outer surface (e.g., the bottom surface 26 and the surfaces 36A, 36B of the sidewalls 34A, 34B) is smaller at the peripheral edge 38 than within a central region 39 of the midsole preform 12A. The peripheral edge 38 is continuous and surrounds the entire midsole preform 12A. For example, the midsole preform 12A may taper in thickness from the central region 39 to the peripheral edge 38 at the sidewalls 34A, 34B of the midsole preform 12A as indicated by a first thickness T1 in the central region 39 and a lesser thickness T2 nearer the peripheral edge 38 than the central region 39. The midsole 12 in its final formed shape is also thicker in the central region 39 than at the sidewalls 34A, 34B.

Figure 12:
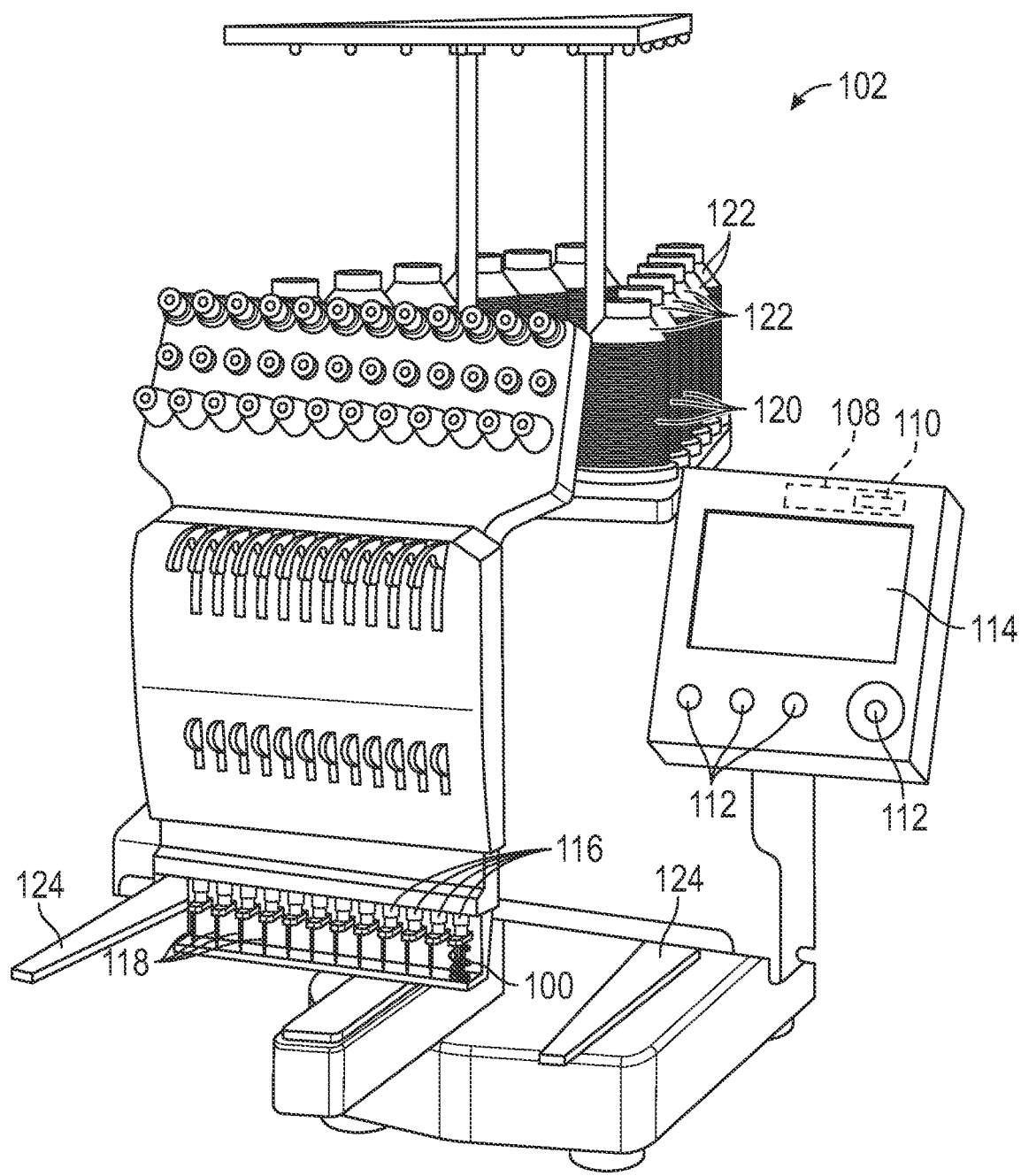
FIG. 12 is a perspective view of a representative embroidery machine used to create the pattern of openings in the midsole of FIGS. 1, 7, and 18.

FIG. 12 shows a representative embroidery machine 102 that has a controller 108 with a stored program 110 to control operation of one or more needle drives 116. The controller 108 may receive input instructions via electronic or wireless signals generated by an operator accessing input devices such as buttons 112 and/or a display screen 114 to control operation of the one or more needle drives 116. Cutting tools 100 can be disposed in one or more of the needle drives 116, as shown by the furthest right needle drive in FIG. 12. The cutting tool 100 may also be referred to as a punch needle. The other needle drives 116 in FIG. 12 are shown housing needles 118, but these are either removed, not driven during the cutting operation, or are replaced with additional cutting tools 100 so that multiple cutting tools 100 may be controlled simultaneously to impart a pattern of openings in the midsole preform 12A. Alternatively, each of the openings 30 can be imparted by a single needle drive 116 and the single cutting tool 100 shown.

The fixture 104 of FIG. 11 is coupled to and rests on the transversely movable frame 124 of the embroidery machine 102 to move the midsole preform 12A transversely relative to the driven and repetitively longitudinally (e.g., up and down) oscillating cutting tool(s) 100. Although in other operations the embroidery machine 102 is operable to embroider via the needle drives 116 using one or more threads 120 stored on spools 122, no thread is used during the cutting operation described herein.

Figure 13:
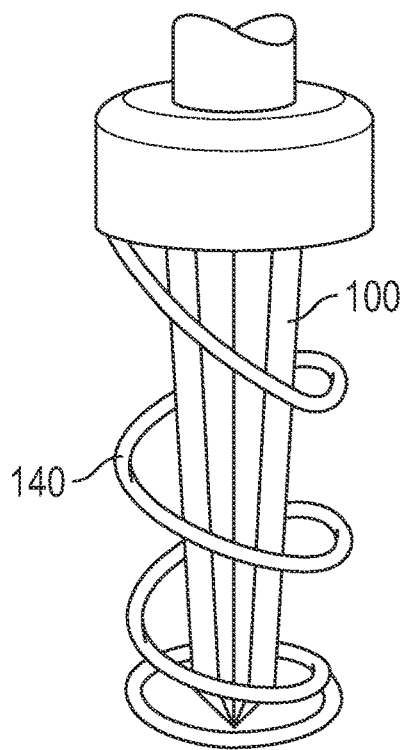
FIG. 13 is a fragmentary perspective view of the cutting tool of FIG. 11 and a spring housing.
Figure 15:
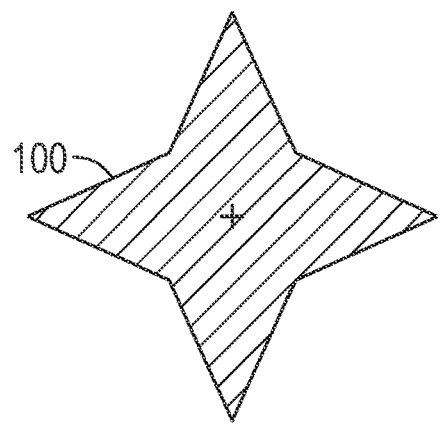
FIG. 15 is a cross-sectional view of the cutting tool of FIG. 14 taken at lines 15-15 in FIG. 14.

FIGS. 13 and 14 shows the cutting tool 100 is cone-shaped along a length L of the cutting tool 100. In FIG. 13, a compressible spring guide 140 surrounds and shields the cutting tool 100. The spring guide 140 is not shown in FIG. 11 for clarity but maybe used and will compress against the outer surface 26, 42A, 42B of the midsole preform 12A during cutting. FIG. 15 best shows that the cutting tool 100 has a star shape at a cross-section taken perpendicular to the length L of the cutting tool 100. The star is a four-pointed star, resulting in the four-pointed opening 30 best shown in FIGS. 6 and 8.

Figure 16:
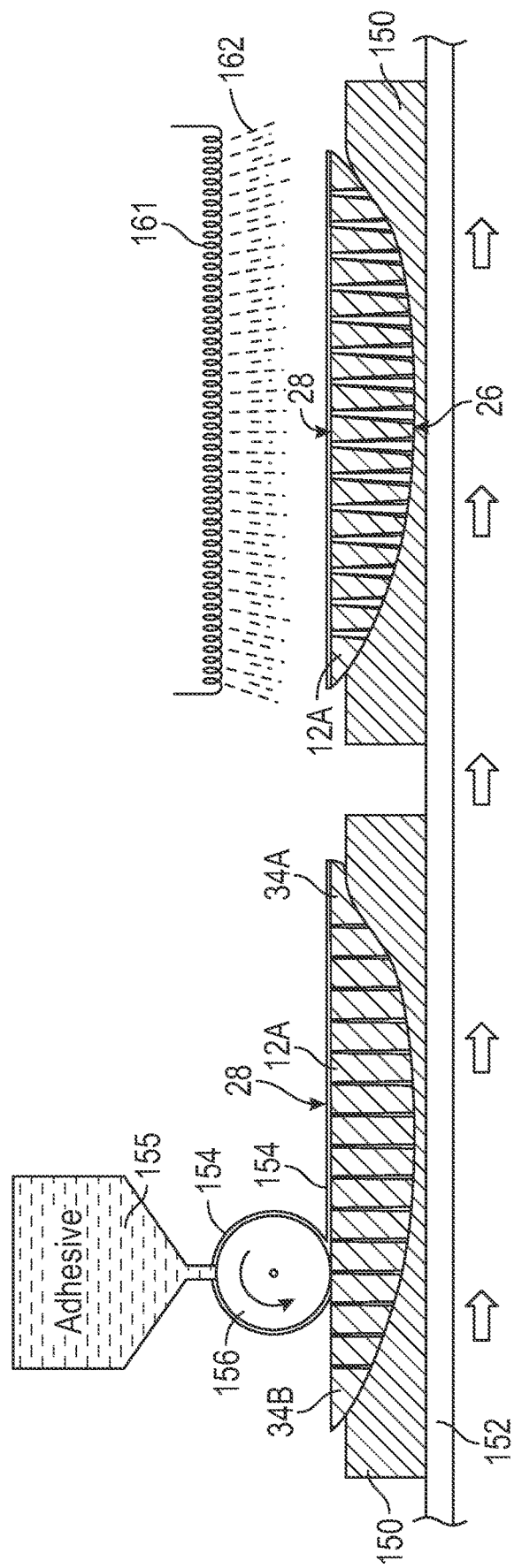
FIG. 16 is a partial cross-sectional view of an assembly diagram of a process for applying adhesive and heating the midsole preform of FIG. 11.

After cutting the openings 30 in the midsole preform 12A as indicated in FIG. 9, the midsole preform 12A is then inverted again so that its flat inner surface 28 faces upward, and is placed in a recess of a supportive work fixture 150 on a conveyor 152 as shown in FIG. 16. Adhesive 154 from a supply source 155 is disposed on the inner surface 28 of the midsole preform 12A. Because the inner surface 28 is substantially planar, the adhesive layer 154 is relatively easy to apply via a roller 156.

Following the application of the adhesive 154, the midsole preform 12A may continue on a conveyor 152 in the direction of the arrows shown below the conveyor 152 in FIG. 16 to be subjected to a thermoforming process in which it obtains its final formed shape and is positioned on and secured to the upper 14. In general, the thermoforming process involves heating up at least a portion of the midsole preform 12A, forming it to a surface (e.g., via vacuum forming) in its final formed shape, and then cooling the final formed midsole 12 to maintain it in the final formed shape. Accordingly, the midsole preform 12A is first heated to soften the midsole preform 12A. As further shown in FIG. 16, in an embodiment, the heating may be performed by a radiant heating element 161 or convective heating nozzles (not shown) that apply thermal energy 162 at the inner surface 28 of the midsole preform 12A. The primary purpose of the heating is to soften the midsole preform 12A at the inner surface 28 only to a point where it can be thermoformed to the upper 14. If the midsole preform 12A is heated too much, then it may lose some structural integrity and/or its properties may change to an undesirable degree. As such, in an embodiment, a temperature gradient should exist between the inner surface 28 and the outer surface (e.g., bottom surface 26). In one configuration, the work fixture 150 upon which the midsole preform 12A rests may serve as a heatsink to cool the midsole preform 12A at the bottom surface 26 while the midsole preform 12A is being heated at the inner surface 28.

In an aspect, the midsole preform 12A may be a foamed thermoplastic. A midsole of this material may decrease in volume due to the heating during thermoforming so that the openings 30 are wider after thermoforming than before thermoforming (e.g., a volume of the midsole preform 12A is greater than the volume of the midsole 12 in its final formed shape). FIG. 16 illustrates the volume change as the openings 30 widen as the material of the midsole preform 12A is heated during the thermoforming process (e.g., the openings 30 are wider at the representation of the midsole preform 12A at the right of FIG. 16 in comparison to the midsole preform 12A prior to heating (e.g., at the left of FIG. 16)).

Figure 17:
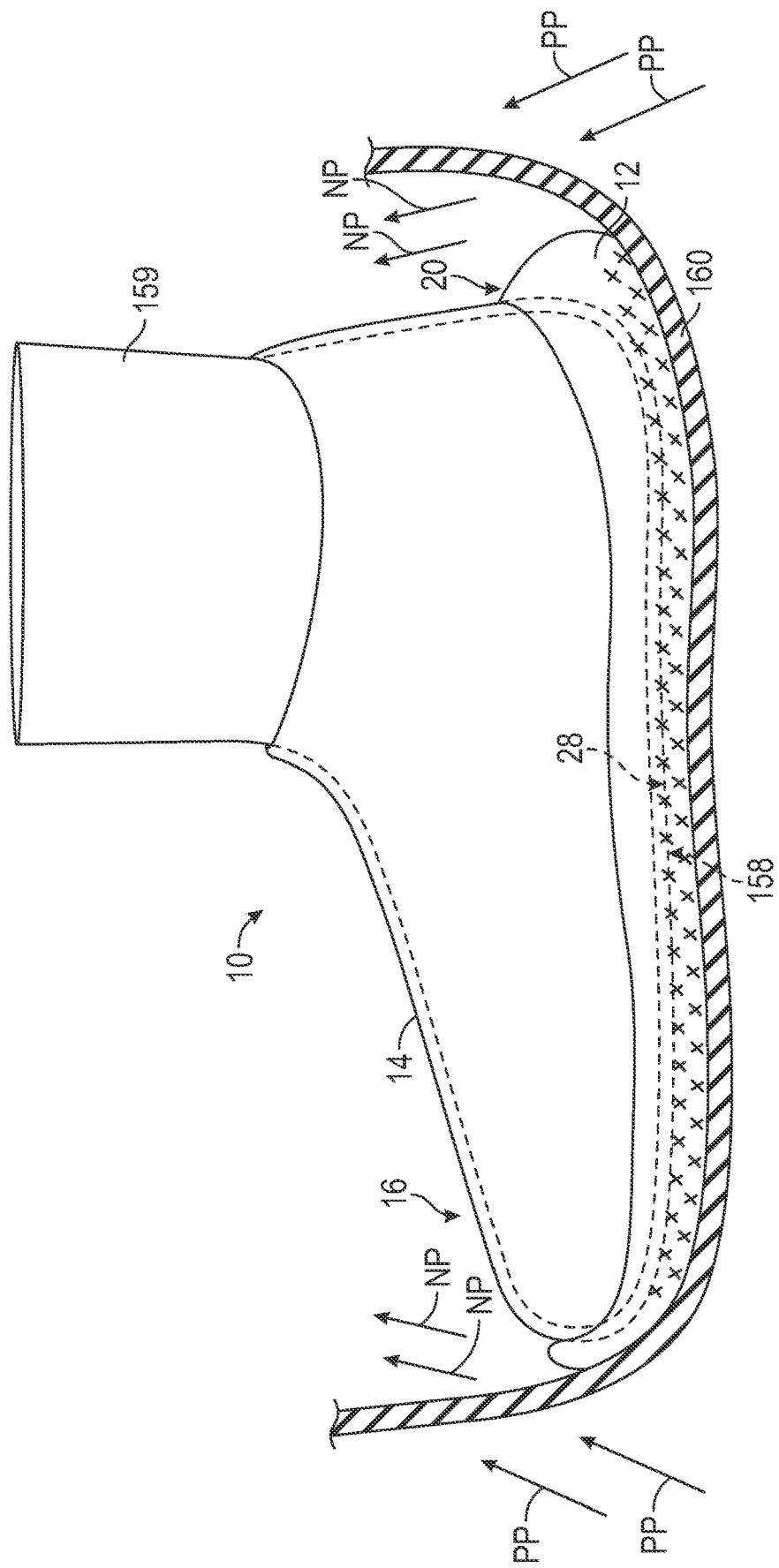
FIG. 17 is a medial side view of a lasted upper and the midsole of FIG. 16 being thermoformed to the upper.

Once the midsole preform 12A is softened to a point where it may be thermoformed, it may then be positioned adjacent to the outer surface 158 of the upper 14 which has been lasted (e.g., placed on a footwear last 159), as shown in FIG. 17. Once the outer surface 158 of the upper 14 is adjacent to the inner surface 28 of the midsole preform 12A, the heated midsole preform 12A may be urged into contact with the upper 14, such as by vacuum forming, where it may then be cooled to retain its final formed shape as midsole 12. For example, the softened midsole preform 12A may be drawn into contact with the lasted upper 14, such as through the use of any or all of positive external pressure PP, negative internal pressure NP, compliant fixturing, or the like. In vacuum forming, the lasted upper 14 and midsole preform 12A may be placed in their predefined arrangement under a compliant polymeric sheet 160 shown in cross-sectional view. Once in position, a vacuum may be created with the negative pressure NP such that the sheet 160 exerts a force against the midsole preform 12A to urge it into contact with the upper 14. In doing so, the adhesive 154 may be drawn into contact with the bottom surface 158 of the upper 14 and portions of the midsole preform 12A adhere to the bottom surface 158 of the upper 14 as well as bending into contact and adhering to the sidewalls 36A, 36B (e.g., FIG. 5) of the upper 14, as well as around the rear of the upper 14 in the heel region 20 and the front of the upper 14 in the forefoot region 16.

Once thermoformed, the inner surface 28 of the midsole 12 is therefore no longer substantially planar, and is instead contoured and may be concave as shown in FIG. 5, for example. The bending caused by the thermoforming process and particularly the vacuum forming causes the plurality of openings 30 to partially splay open to the positions shown in FIG. 5, for example. Stated differently, at least some of the longitudinal axes 40 of the openings 30 extend relatively nonparallel with one another and splay away from one another in the midsole 12 in its final formed shape. FIGS. 1, 2, and 5 show that some of the openings 30 open at the side surfaces 42A, 42B of the midsole 12 and are exposed at the side surfaces 42A, 42B.

Figure 18:
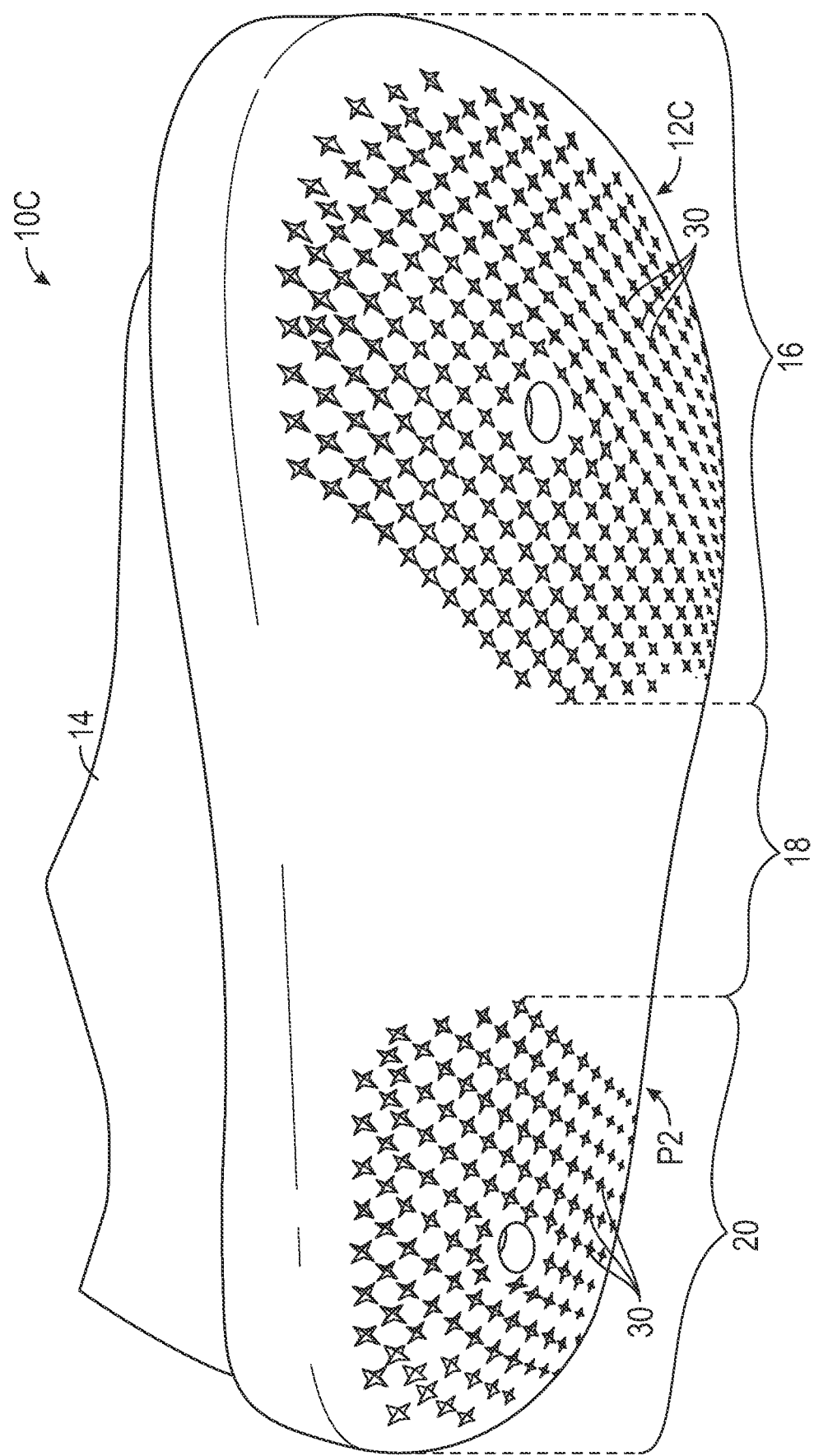
FIG. 18 is a bottom perspective view of an alternative midsole with a second pattern of openings cut with the cutting tool driven by the embroidery machine of FIG. 12.

FIG. 18 shows another embodiment of an article of footwear 10C with a midsole 12C that is alike in all aspects to the article of footwear 10 and midsole 12 except that the midsole 12C has a second pattern P2 of openings 30 different than the first pattern P1 and cut into the midsole 12C with the cutting tool 100 driven by the embroidery machine 102. The operator of the embroidery machine 102 selects a second program stored in the controller 108 of the embroidery machine 102 that drives the cutting tool 100 according to the second pattern P2. In the second pattern P2, the midfoot region 18 of the midsole 12C is mostly devoid of openings 30. Stated differently, the openings 30 are cut in the forefoot region 16 and in the heel region 20, but not in the midfoot region 18. The second pattern P2 of openings 30 may generally correspond with a foot pressure map, as the heel region 20 and the forefoot region 16 are subjected to greater compressive forces during wear due to larger dynamic loads than the midfoot region 18.

Figure 19:
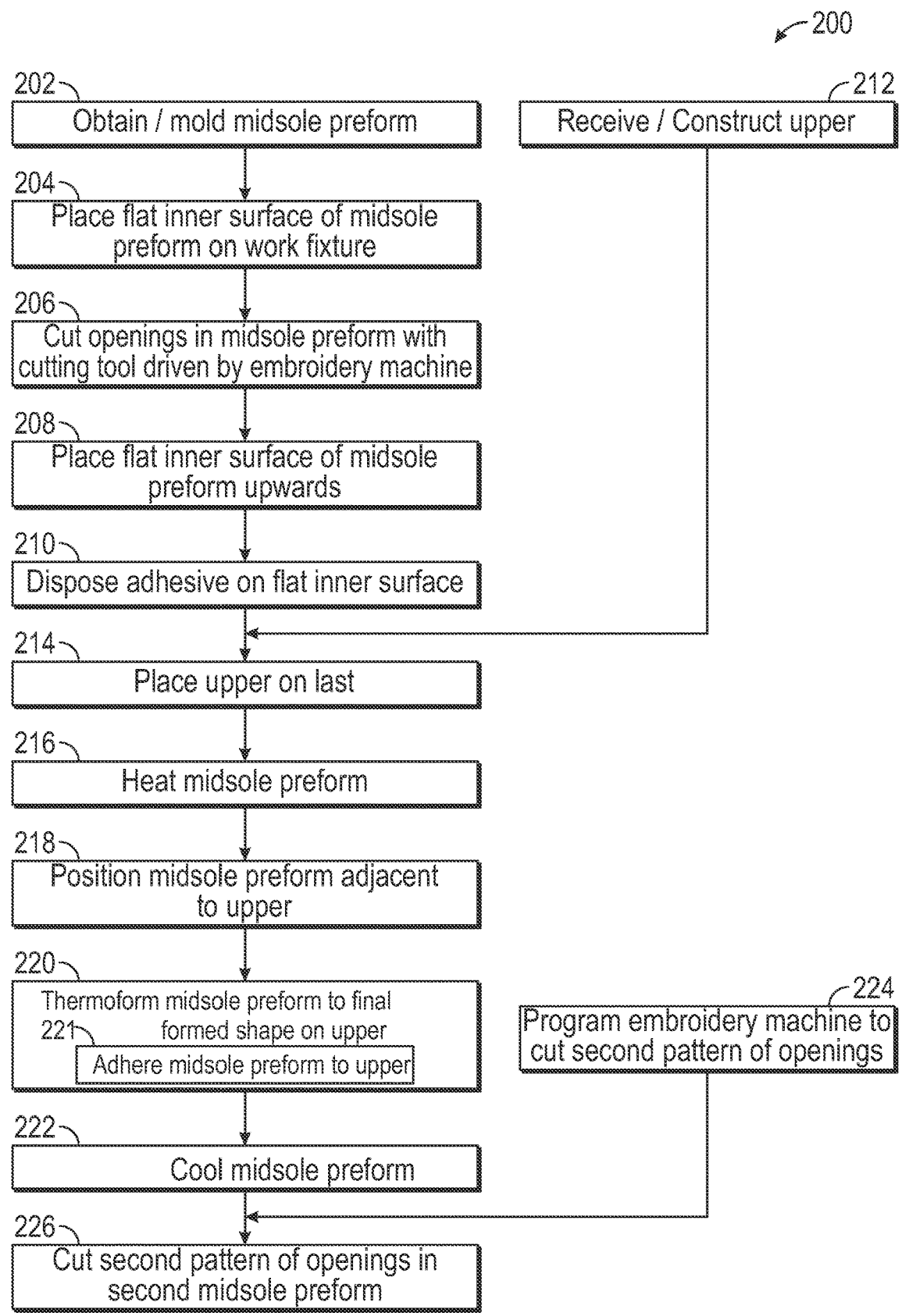
FIG. 19 is a flow diagram of a method of manufacturing an article of footwear.

FIG. 19 is a flowchart of a method 200 of manufacturing an article of footwear to provide any of the midsoles described herein, for example. The method 200 is described with respect to the article of footwear 10 and midsole preform 12A, and begins with step 202, obtaining a midsole preform such as midsole preform 12A. In some implementations of the method 200, the entity carrying out the method 200 also molds the midsole preform 12A in which case obtaining the midsole preform 12A in step 202 encompasses molding the midsole preform. In other cases, a separate entity molds the midsole preform 12A than the entity obtaining the midsole preform 12A and carrying out the method 200.

In step 204, a flat inner surface 28 of the midsole preform 12A is placed down, such as on a work fixture 104 as illustrated by inner surface 28 of midsole preform 12A in FIG. 11. Next, in step 206, the embroidery machine 102 is operated to cut a pattern of openings at least partway through the midsole preform 12A, from the contoured outer surface 26, 42A, 42B to the inner surface 28, with the cutting tool 100 driven by the embroidery machine 102, according to a program 110 stored in the controller 108. The program 110 controls the distance that the cutting tool 100 extends into the midsole preform 12A during cutting to control the resulting openings 30. For example, when cutting the midsole preform 12A, the cutting tool 100 extends entirely through the midsole preform 12A, whereas when cutting the midsole preform 12B, the cutting tool 100 is controlled to travel a distance less than the thickness of the midsole preform 12B at each opening 30 so that the openings 30 extend only partway through the midsole preform 12B.

After cutting the openings 30, the flat inner surface 28 of the midsole preform 12A is placed upwards (e.g., faceup) in step 208, and adhesive 154 is disposed on the flat inner surface 28 in step 210.

In step 212, an upper 14 is received or constructed. In some embodiments, the same entity carrying out the method 200 constructs the upper 14 (e.g., forms, sews, or otherwise manufactures the upper 14). In other embodiments, the upper 14 is received in step 212 already in a constructed state, and ready to be placed on the last 159 in step 214.

In step 214, the upper 14 is lasted (e.g., placed on the footwear last 159). In step 216, the midsole preform 12A is heated as described herein, and positioned adjacent the lasted upper 14 in step 218. The heated midsole preform 12A can then be thermoformed to its final formed shape in step 220, which includes urging the heated midsole preform 12A into contact with the upper 14, such as by vacuum forming as described herein, where it adheres to the upper 14 in sub-step 221 of step 220. The thermoformed midsole 12 is then allowed to cool passively in the environment or actively by blowing air or passing through a cooler in step 222.

The method 200 is complete with respect to the manufacturing of the midsole 12 of the article of footwear 10 after step 224. Subsequent processing may include securing one or more outsole components, if any, to the midsole 12. Steps 202-222 may be repeated again to manufacture another article of footwear substantially identical to the article of footwear 10. In another aspect, the method 200 may include utilizing a different stored program 110 in the embroidery machine in step 226 to cut a second pattern of openings in a second midsole of a second article of footwear, such as the article of footwear 10C with the pattern P2 of openings 30 in FIG. 18. The embroidery machine 102 may first be programmed in step 224 to cut the second pattern P2 of openings different than the first pattern P1, such as but not limited to the pattern P2 disclosed herein. However, a different entity may program the embroidery machine 102 than the entity carrying out the rest of the method 200, or the same entity carrying out the method 200 may program the embroidery machine 102 in step 224. Accordingly, the method 200 includes step 224 only of the same entity operating the embroidery machine 102 to cut the second pattern of openings P2 programs the machine 102. Otherwise, the operator simply accesses the stored program using one of the operator input devices (e.g., buttons 112 and/or display screen 114) and the method 200 may include step 226, cutting a second pattern of openings P2 in a second midsole preform 12C, for example. Step 226 includes repeating steps 202 to 222 as sub-steps using the second midsole preform 12C. In other examples, the second pattern may include use of a different cutting tool in the embroidery machine (e.g., a cutting tool with a different longitudinal or cross-sectional shape), but be may be otherwise the same as the first pattern.

The following Clauses provide example configurations of an article of footwear and a method of manufacturing an article of footwear disclosed herein.

Clause 1. A method of manufacturing a midsole for an article of footwear, the method comprising: cutting a pattern of openings at least partway through a midsole with a cutting tool driven by an embroidery machine.

Clause 2. The method of manufacturing of clause 1, wherein the cutting tool is disposed in a needle drive of the embroidery machine.

Clause 3. The method of manufacturing of clause 1, wherein the cutting tool is cone-shaped along a length of the cutting tool.

Clause 4. The method of manufacturing of clause 1, wherein the cutting tool is a star shape at a cross-section taken perpendicular to a length of the cutting tool.

Clause 5. The method of manufacturing of clause 1, wherein the openings extend only partway through the midsole.

Clause 6. The method of manufacturing of clause 1, wherein the openings extend completely through the midsole from an inner surface of the midsole to an outer surface of the midsole.

Clause 7. The method of manufacturing of clause 1, wherein the midsole is a preform when said cutting occurs, and the method further comprising: after said cutting, thermoforming the preform to a midsole final formed shape.

Clause 8. The method of manufacturing of clause 7, wherein: the preform has a flat inner surface and a contoured outer surface and longitudinal axes of the openings extend relatively parallel with one another at least partially through the preform; and an inner surface of the midsole is contoured in the midsole final formed shape and at least some of the longitudinal axes of the openings extend relatively nonparallel with one another and splay away from one another in the midsole final formed shape.

Clause 9. The method of manufacturing of clause 8, further comprising: disposing adhesive on the flat inner surface of the preform; and adhering the inner surface of the midsole to a bottom of a footwear upper and to sidewalls of the footwear upper during said thermoforming.

Clause 10. The method of manufacturing of clause 9, further comprising: lasting the footwear upper prior to adhering the inner surface of the midsole to the footwear upper.

Clause 11. The method of manufacturing of clause 8, wherein said cutting includes driving the cutting tool from the contoured outer surface to the flat inner surface of the preform.

Clause 12. The method of manufacturing of clause 8, wherein the midsole is a foamed thermoplastic and a volume of the midsole decreases due to said thermoforming so that the openings are wider after said thermoforming than before said thermoforming.

Clause 13. The method of manufacturing of clause 1, wherein the pattern of openings is a first pattern and the midsole is a first midsole, and the method of manufacturing further comprising: programming the embroidery machine to drive the cutting tool according to a second pattern different than the first pattern; and cutting openings at least partway through a second midsole in the second pattern with the cutting tool driven by the embroidery machine.

Clause 14. An article of footwear comprising: a midsole defining a pattern of openings extending at least partway through the midsole; wherein an inner surface of the midsole is contoured and the midsole includes upwardly-extending sidewalls; and wherein at least some of the openings extend relatively nonparallel with one another through the sidewalls and splay away from one another along longitudinal axes of the openings.

Clause 15. The article of footwear of clause 14, wherein each of the openings is cone-shaped along a length of the opening.

Clause 16. The article of footwear of clause 14, wherein each of the openings is a star shape at a cross-section taken perpendicular to a length of the opening.

Clause 17. The article of footwear of clause 14, wherein the openings extend only partway through the midsole.

Clause 18. The article of footwear of clause 14, wherein the openings extend completely through the midsole from the inner surface of the midsole to an outer surface of the midsole.

Clause 19. The article of footwear of clause 14, wherein a thickness of the midsole between the inner surface and an outer surface of the midsole tapers from a central region of the midsole to a peripheral edge of the midsole.

Clause 20. The article of footwear of clause 14, further comprising: a footwear upper; wherein the inner surface of the midsole is adhered to the footwear upper and follows a contour of the footwear upper; and wherein the sidewalls of the midsole extend up sidewalls of the footwear upper.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
a midsole defining a pattern of openings extending completely through the midsole from an inner surface of the midsole to an outer surface of the midsole at an exterior of the article of footwear, each of the openings entirely surrounded by material of the midsole from the inner surface to the outer surface;
wherein each of the openings is wider at the outer surface of the midsole than at the inner surface of the midsole and tapers in width along a longitudinal axis of the opening from the outer surface of the midsole to the inner surface of the midsole;
wherein each of the openings is symmetrical about two different axes that are perpendicular to one another and are perpendicular to the longitudinal axis of the opening;
wherein the inner surface of the midsole is contoured and the midsole includes upwardly-extending sidewalls;
wherein at least some of the openings extend relatively nonparallel with one another through the sidewalls, open at an exterior side surface of the midsole and are exposed at the exterior of the article of footwear, and splay away from one another along the longitudinal axes of the openings;
a footwear upper;
wherein the inner surface of the midsole contacts and is secured to the footwear upper;
wherein each of the openings is empty from the inner surface of the midsole to the outer surface of the midsole;
wherein each of the openings is a four-pointed star shape at a cross-section taken perpendicular to the longitudinal axis of the opening;

wherein a region of the midsole is subjected to a greater compressive force during wear than another region of the midsole;

wherein the pattern of openings corresponds with the region of the midsole subjected to the greater compressive force during wear; and wherein the pattern of openings consists of openings in a forefoot region of the midsole and openings in a heel region of the midsole, and a midfoot region of the midsole is devoid of any openings.

2. The article of footwear of claim 1, wherein a thickness of the midsole between the inner surface and the outer surface of the midsole tapers from a central region of the midsole to a peripheral edge of the midsole.

3. The article of footwear of claim 1, wherein the inner surface of the midsole is adhered to the footwear upper and follows a contour of the footwear upper; and wherein the sidewalls of the midsole extend up sidewalls of the footwear upper.

4. The article of footwear of claim 1, wherein the midsole comprises a foamed thermoplastic.

5. The article of footwear of claim 1, wherein the openings extend only partway up the sidewalls such that at least an upper half of the exterior side surface of the midsole at each of the sidewalls is characterized by an absence of the openings.

6. The article of footwear of claim 1, wherein the openings in the forefoot region extend further rearward at a lateral side of the midsole than at a medial side of the midsole.

7. The article of footwear of claim 1, wherein the openings in the heel region extend further forward at a medial side of the midsole than at a lateral side of the midsole.

8. The article of footwear of claim 1, wherein:
the openings in the forefoot region extend further rearward at a lateral side of the midsole than at a medial side of the midsole; and
the openings in the heel region extend further forward at the medial side of the midsole than at the lateral side of the midsole.

* * * * *